United States Patent
Schaeffer et al.

(10) Patent No.: US 12,228,047 B2
(45) Date of Patent: *Feb. 18, 2025

(54) PRE-SINTERED PREFORM SEALING DEVICE WITH HOLLOW MEMBER THEREIN FOR METERING FLOW THROUGH PASSAGE OF TURBOMACHINE COMPONENT

(71) Applicant: GE Infrastructure Technology, LLC, Greenville, SC (US)

(72) Inventors: Ethan Conrad Schaeffer, Greenville, SC (US); Weston Suchenski, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,600

(22) Filed: Jul. 19, 2023

(65) Prior Publication Data
US 2024/0229649 A1 Jul. 11, 2024

Related U.S. Application Data

(63) Continuation-in-part of application No. 17/657,414, filed on Mar. 31, 2022, now Pat. No. 11,739,646.

(51) Int. Cl.
*F01D 5/18* (2006.01)
(52) U.S. Cl.
CPC .......... *F01D 5/18* (2013.01); *F05D 2220/32* (2013.01); *F05D 2230/237* (2013.01);
(Continued)
(58) Field of Classification Search
CPC ........ F01D 25/12; F01D 5/18; F05D 2230/60; F05D 2240/12; F05D 2240/30; F05D 2260/20
See application file for complete search history.

(56) References Cited

U.S. PATENT DOCUMENTS

| | | |
|---|---|---|
| 4,185,369 A | 1/1980 | Darrow et al. |
| 4,249,291 A | 2/1981 | Grondahl et al. |

(Continued)

FOREIGN PATENT DOCUMENTS

| | | |
|---|---|---|
| EP | 1205639 A1 | 5/2002 |
| EP | 2230381 A3 | 9/2010 |

OTHER PUBLICATIONS

Notice of Allowance and Fee(s) Due mailed Apr. 13, 2023 for U.S. Appl. No. 17/657,414, filed Mar. 31, 2022; pp. 14.

(Continued)

*Primary Examiner* — Elton K Wong
*Assistant Examiner* — Theodore C Ribadeneyra
(74) *Attorney, Agent, or Firm* — James Pemrick; Charlotte Wilson; Hoffman Warnick LLC

(57) ABSTRACT

A flow metering apparatus for a passage in a turbomachine component, the turbomachine component, and a method of using the apparatus, are provided. The apparatus may include a pre-sintered preform (PSP) sealing device with a sealing body. The sealing body has an opening defined therethrough having a first cross-sectional area. A hollow member is fixed within the opening defined through the sealing body. The hollow member has a second cross-sectional area smaller than the first cross-sectional area of the opening, and is made of a material having a melt temperature higher than a melt temperature of the PSP material. The method includes positioning the sealing device and brazing the sealing device in place. The hollow member maintains fluid communication through the sealing device after the brazing, and allows customized metering of the coolant flow therethrough.

20 Claims, 5 Drawing Sheets

(52) U.S. Cl.
CPC ...... *F05D 2240/30* (2013.01); *F05D 2240/55* (2013.01); *F05D 2260/20* (2013.01)

(56) References Cited

U.S. PATENT DOCUMENTS

| | | |
|---|---|---|
| 6,422,817 B1 | 7/2002 | Jacala |
| 6,929,825 B2 | 8/2005 | Wustman et al. |
| 6,966,756 B2 | 11/2005 | McGrath et al. |
| 7,216,694 B2 | 5/2007 | Otero et al. |
| 7,674,093 B2 | 3/2010 | Lee et al. |
| 8,454,301 B1 | 6/2013 | Liang |
| 9,340,047 B2 | 5/2016 | Sreekumar et al. |
| 10,006,293 B1 | 6/2018 | Jones |
| 10,443,403 B2 | 10/2019 | Pooley et al. |
| 2005/0152785 A1 | 7/2005 | McGrath et al. |
| 2007/0036942 A1 | 2/2007 | Steele |
| 2010/0059573 A1 | 3/2010 | Kottilingam et al. |
| 2010/0239409 A1 | 9/2010 | Draper |
| 2018/0161853 A1 | 6/2018 | Deines et al. |
| 2018/0209277 A1 | 7/2018 | Dooley et al. |
| 2019/0039133 A1 | 2/2019 | Cui et al. |
| 2020/0222978 A1 | 7/2020 | Deines et al. |
| 2021/0071533 A1 | 3/2021 | Cui et al. |

OTHER PUBLICATIONS

Restriction Requirement mailed Feb. 14, 2023 for U.S. Appl. No. 17/657,414, filed Mar. 31, 2022; pp. 6.
EP Search Report dated May 31, 2023 for Application No. 23161400.9; pp. 10.

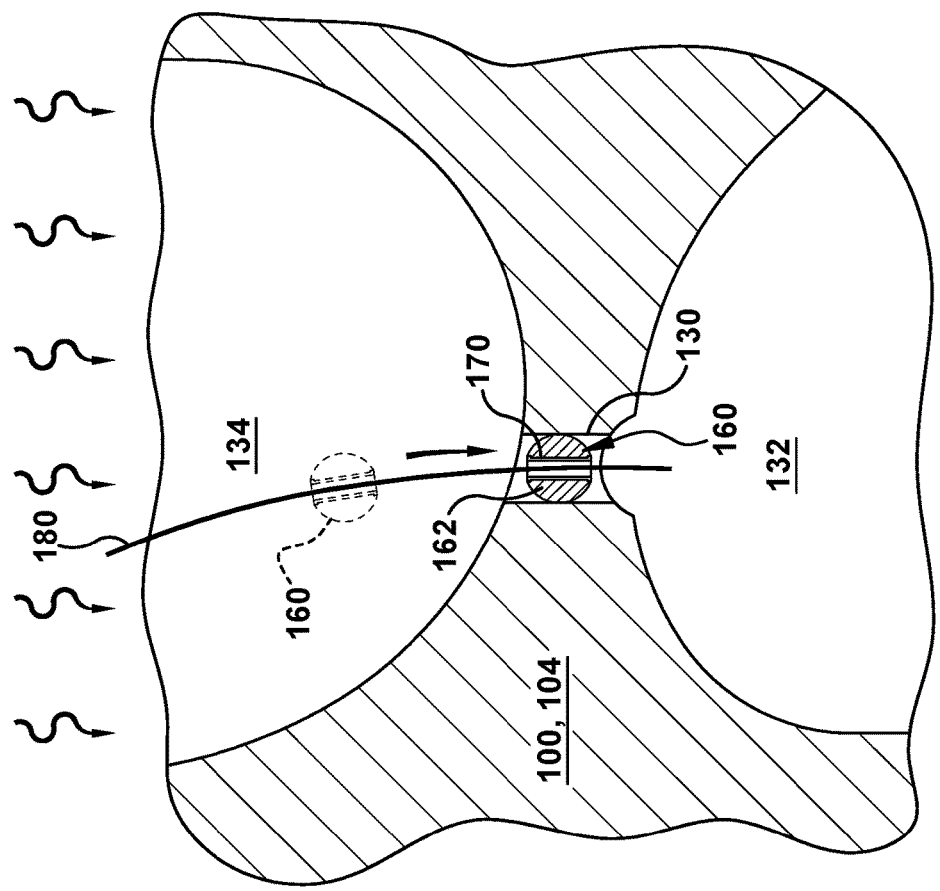
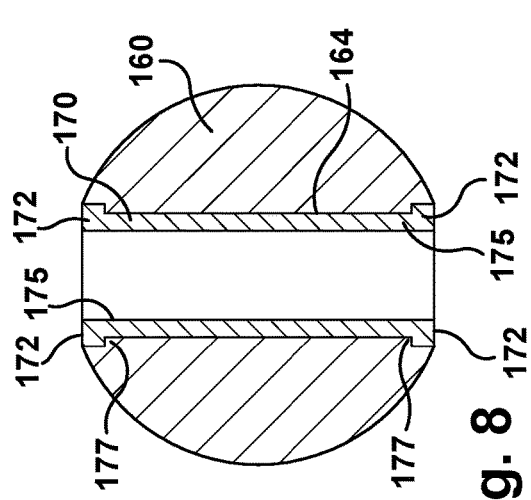
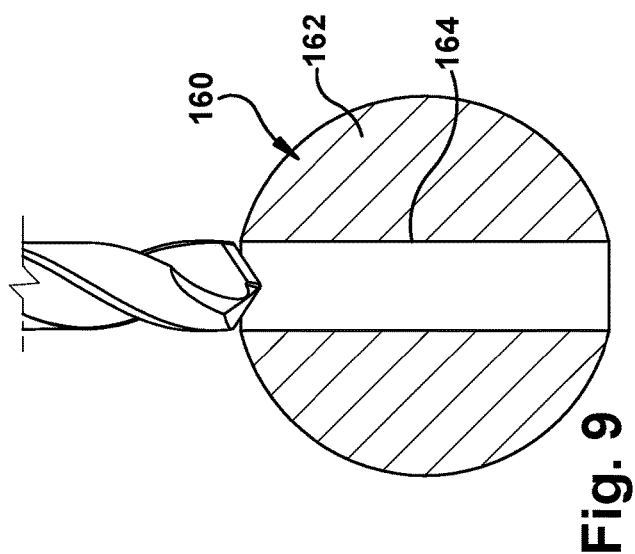

PRE-SINTERED PREFORM SEALING DEVICE WITH HOLLOW MEMBER THEREIN FOR METERING FLOW THROUGH PASSAGE OF TURBOMACHINE COMPONENT

TECHNICAL FIELD

The disclosure relates generally to turbomachines, and more particularly, to a pre-sintered preform (PSP) sealing device including a sealing body with a hollow member therein for metering flow through a passage of a turbomachine component.

BACKGROUND

After a turbomachine component is formed, balls may be placed into one or more selected passages in the turbomachine component to adjust a coolant flow through the selected passages during use of the turbomachine component. The passages into which the balls are placed are sometimes referred to as "ball-chutes." The balls are placed into the ball-chutes, and brazed into place through a brazing heating cycle. The balls may block coolant flow, or they may have holes of a desired size drilled into them to allow a metered amount of coolant to flow therethrough. The passages and the location of the balls in the turbomachine component are becoming harder to access, making the drilling of a hole through a ball, and the provision of the customized cooling they provide, more challenging.

BRIEF DESCRIPTION

All aspects, examples and features mentioned below can be combined in any technically possible way.

An aspect of the disclosure provides a pre-sintered preform (PSP) sealing device for a passage of a turbine component, the PSP sealing device comprising: a sealing body made of a pre-sintered preform (PSP) material, the sealing body having an opening defined therethrough having a first cross-sectional area, and the sealing body having an outer dimension configured to position the sealing body in the metered passage of the turbine component; and a hollow member fixed within the opening defined through the sealing body, the hollow member having a second cross-sectional area smaller than the first cross-sectional area of the opening, wherein the hollow member is made of a material having a melt temperature higher than a melt temperature of the PSP material.

Another aspect of the disclosure includes any of the preceding aspects, and the hollow member includes a flange extending from at least one end thereof, each flange engaging with an end of the opening to fix the hollow member in the opening.

Another aspect of the disclosure includes any of the preceding aspects, and the material of the hollow member consists of a superalloy.

Another aspect of the disclosure includes any of the preceding aspects, and the sealing body is a ball.

An aspect of the disclosure includes a turbomachine component, comprising: a component body having a metered passage therein; and a pre-sintered preform (PSP) sealing device positioned in the metered passage, the PSP sealing device including: a sealing body brazed into position in the metered passage, the sealing body made of a PSP material, the sealing body having an opening defined therethrough having a first cross-sectional area, the sealing body also having an outer dimension configured to position the sealing body in the metered passage; and a hollow member fixed within the opening defined through the sealing body, the hollow member having a second cross-sectional area smaller than the first cross-sectional area of the opening, wherein the hollow member is made of a material having a melt temperature higher than a melt temperature of the PSP material.

Another aspect of the disclosure includes any of the preceding aspects, and the hollow member includes a flange extending from at least one end thereof, each flange engaging with an end of the opening to fix the hollow member in the opening.

Another aspect of the disclosure includes any of the preceding aspects, and the material of the hollow member consists of a superalloy.

Another aspect of the disclosure includes any of the preceding aspects, and the component body includes a turbine blade airfoil.

Another aspect of the disclosure includes any of the preceding aspects, and the turbine blade airfoil is in a first stage of a turbine.

Another aspect of the disclosure includes any of the preceding aspects, and the sealing body is a ball.

An aspect of the disclosure relates to a method comprising: positioning a pre-sintered preform (PSP) sealing device in a metered passage in a turbomachine component, the PSP sealing device including: a sealing body made of a PSP material having an outer dimension configured to position the sealing body in the metered passage, the sealing body having an opening defined therethrough, the opening having a first cross-sectional area; and a hollow member fixed within the opening of the sealing body, the hollow member having a second cross-sectional area smaller than the first cross-sectional area of the opening; and brazing the sealing body of the PSP sealing device in the metered passage, wherein the hollow member maintains fluid communication through the sealing body after the brazing.

Another aspect of the disclosure includes any of the preceding aspects, and the hollow member includes a flange extending from at least one end thereof, each flange engaging with an end of the opening to fix the hollow member in the opening.

Another aspect of the disclosure includes any of the preceding aspects, and the hollow member is made of a different material than the PSP material.

Another aspect of the disclosure includes any of the preceding aspects, and the material of the hollow member has a melt temperature higher than a melt temperature of the PSP material.

Another aspect of the disclosure includes any of the preceding aspects, and the material of the hollow member consists of a superalloy.

Another aspect of the disclosure includes any of the preceding aspects, and further comprising: forming the opening in the sealing body; and fixing the hollow member in the opening.

Another aspect of the disclosure includes any of the preceding aspects, and the fixing the hollow member includes forming a flange extending from at least one end thereof, each flange engaging with an end of the opening to fix the hollow member in the opening.

Another aspect of the disclosure includes any of the preceding aspects, and the fixing the hollow member includes expanding the hollow member to engage with an inner surface of the opening in an interference fit.

Another aspect of the disclosure includes any of the preceding aspects, the positioning the PSP sealing device in the metered passage includes feeding the PSP sealing device along an elongated member extending through the hollow member and into the metered passage, the elongated member positioning the PSP sealing device and the hollow member to maintain fluid communication through the hollow member and along the metered passage after the brazing.

An aspect of the disclosure relates to a flow metering apparatus, comprising: a sealing body made of a pre-sintered preform (PSP) material, the sealing body having an opening defined therethrough having a first cross-sectional area, and the sealing body having an outer dimension configured to position the body in a metered passage of a turbine component; and a hollow member fixed within the opening defined through the sealing body, the hollow member having a second cross-sectional area smaller than the first cross-sectional area of the opening, wherein the hollow member is made of a material having a melt temperature higher than a melt temperature of the PSP material and includes a flange extending from at least one end thereof, each flange engaging with an end of the opening to fix the hollow member in the opening.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 8 shows a cross-sectional view of a PSP sealing device including a hollow member in an opening therein, according to other embodiments of the disclosure;

FIG. 9 shows a cross-sectional view of forming an opening in a PSP sealing device for a hollow member, according to embodiments of the disclosure; and FIG. 10 shows an enlarged cross-sectional view of positioning a PSP sealing device including a hollow member in a metered passage, according to embodiments of the disclosure;

Figure 1:
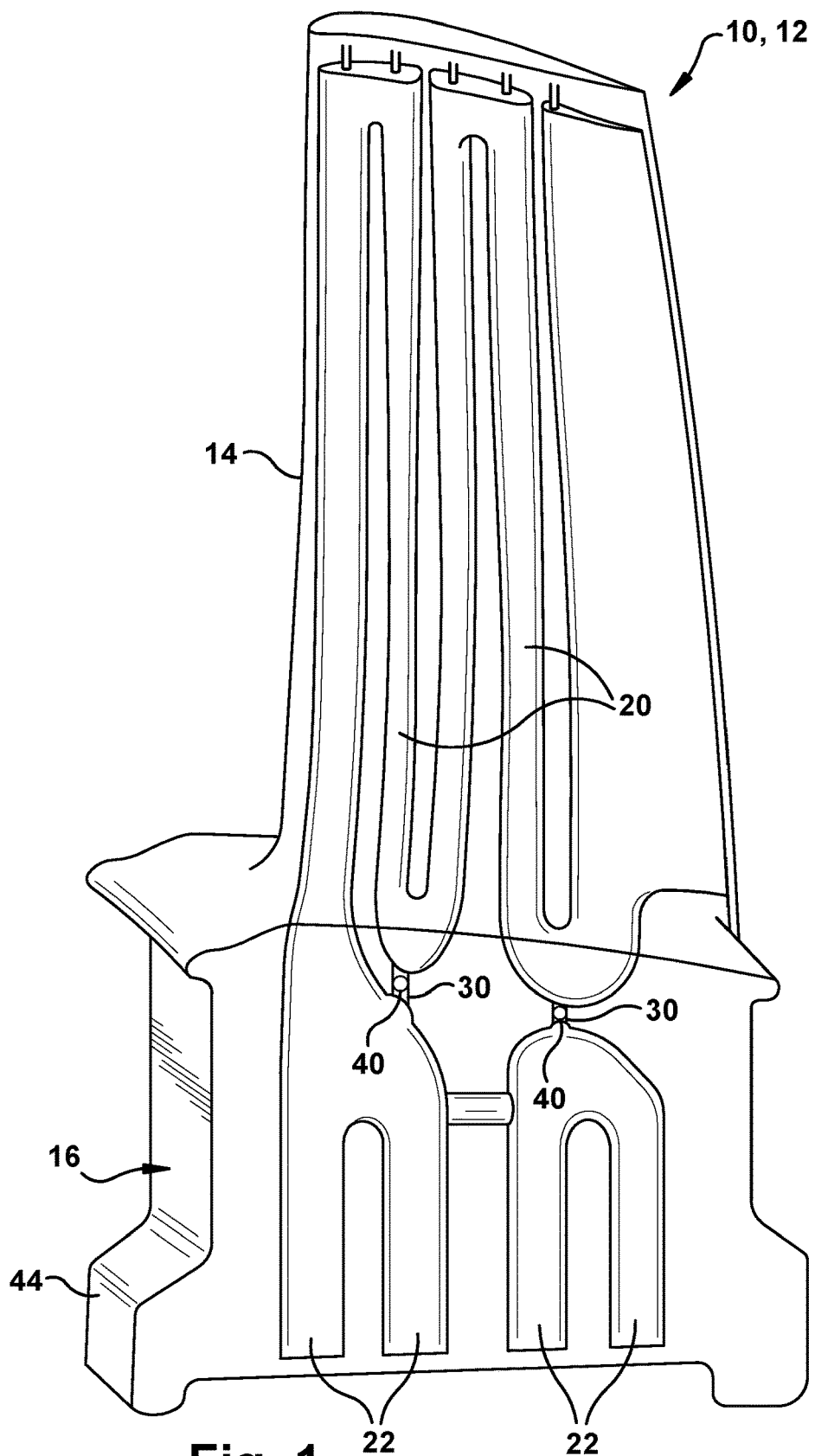
FIG. 1 shows a transparent, perspective view of an illustrative turbomachine component in the form of a turbine blade including a ball for a ball-chute.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure include a ball for a ball-chute in a turbine component, the turbine component, and a method of using the ball. A ball may include a ball body made of a pre-sintered preform (PSP) material. The ball body has an opening defined therethrough having a first cross-sectional area. A hollow member is fixed within the opening defined through the ball body. The hollow member has a second cross-sectional area smaller than the first cross-sectional area of the opening, and is made of a material having a melt temperature higher than a melt temperature of the PSP material. The method includes positioning the ball and brazing the ball in place. The hollow member maintains fluid communication through the ball after the brazing. Hence, the hollow member allows the ball to be brazed into place in a ball-chute in a turbine component, yet continue fluid communication through the ball chute with the coolant flow metered by the cross-sectional area of the hollow member. The hollow member also allows customized metering of the coolant flow therethrough. Because the ball is pre-drilled and an opening for coolant flow is maintained by the hollow member during the brazing, access to the ball-chute after brazing to drill the ball is no longer necessary.

With reference to FIG. 1, a transparent perspective view of an illustrative turbomachine component 10 in the form of a turbine blade 12 is shown. The example turbomachine component 10 includes an airfoil portion 14, a shank 16 and a plurality of radially extending cooling passages 20 that are supplied with a coolant, e.g., cooling air, by way of, for example, inlet cooling passages 22 that are separated in a radially inner portion of shank 16. Turbomachine component 10 also includes two or more ball-chutes 30, also known as "ball braze chutes." Ball-chutes 30 fluidly couple different cooling passages 20, 22. In the example shown, respective inlet passages 22 are fluidly coupled to plurality of radially extending cooling passages 20 by ball-chutes 30. The structure around ball-chutes 30 may be provided to, for example, temporarily support other features during manufacture, e.g., during additive manufacture or casting. After manufacture, ball-chutes 30 are normally plugged by solid balls 40 (sometimes referred to as "braze balls") within the passages formed by ball-chutes 30. Otherwise, the flow in cooling passages 20 would be disturbed if the coolant air was allowed to enter the circuit at these locations. Balls 40, which are typically made of braze-able steel, are positioned in ball-chutes 30 and brazed into place, i.e., using a heating cycle. Subsequently, where some metered coolant flow is determined to be desirable, openings are drilled into balls 40, e.g., through passages 20 and/or 22. Pre-drilling the openings has not heretofore been possible because the openings close during the brazing process. As noted, access to the locations of balls 40 is also becoming increasingly challenging.

Figure 2:
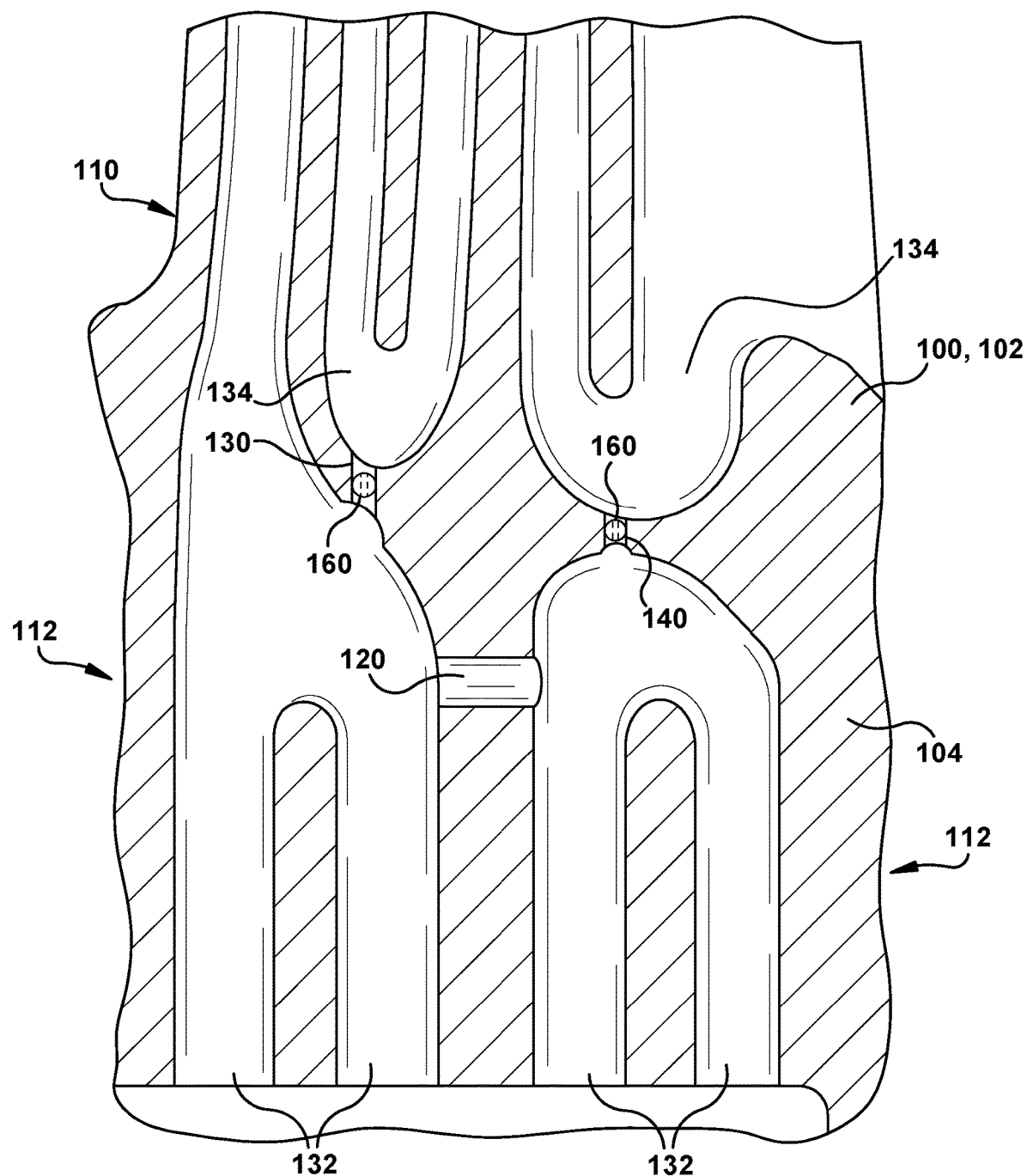
FIG. 2 shows a cross-sectional view of a turbine component with a flow metering apparatus, such as a pre-sintered preform (PSP) sealing device, in a metered passage according to embodiments of the disclosure.
Figure 7:
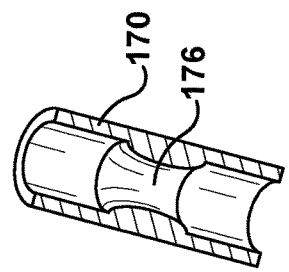
FIG. 7 shows a cross-sectional view of a hollow member, according to yet other embodiments of the disclosure.

FIG. 2 shows a cross-sectional view of a turbomachine component 100 in the form of a turbine blade 102 including a metered passage 130, here shown as a ball-chute 130 between two cooling passages 132, 134. A flow metering apparatus 160 is shown in metered passage 130, according to embodiments of the disclosure and can take the form of a pre-sintered preform (PSP) sealing device as will be described, such as a ball. Flow metering apparatus 160 need not be a ball and can have any suitable shape. In addition, flow metering apparatus 160 can be used in any passage of a turbomachine component.

Figure 3:
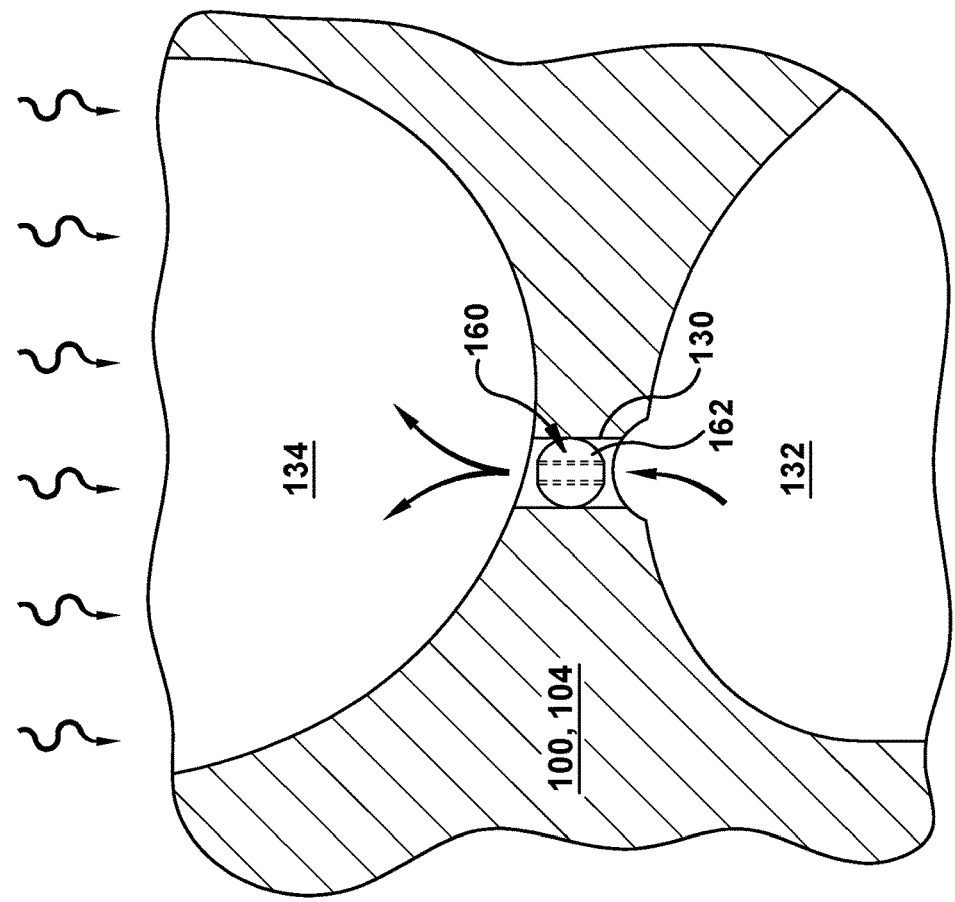
FIG. 3 shows an enlarged cross-sectional view of a turbine component with a PSP sealing device in a metered passage, according to embodiments of the disclosure.

FIG. 3 shows an enlarged cross-sectional view of flow metering apparatus 160 in passage 130, according to embodiments of the disclosure. Turbine blade 102 in FIG. 2 is similarly arranged to that in FIG. 1, but it will be recognized that cooling passages 132, 134 can take a large variety of different forms. Turbine blade 102 may include similar features as turbine blade 12 (FIG. 1) such as but not limited to an airfoil portion 110, a shank 112 and a plurality of radially extending cooling passages 134 that are supplied with a coolant, e.g., cooling air, by way of, for example, inlet cooling passages 132 that are separated in a radially inner portion of shank 112. Turbine blade 102 may include, for example, a stage 1 turbine blade of a 7HA.03 model gas turbine available from General Electric Co., Schenectady, NY. It is emphasized that the teachings of the disclosure are applicable to any turbomachine component 100 having a passage for which flow metering is desired, such as cooling passages 132, 134 therein, including dust holes found in tip pre-sintered preforms, or racetracks in slashfaces. To this end, turbine component 100 may include a component body 104 having a metered passage 130, such as a ball-chute 130 which fluidly couples cooling passages 132, 134. While shown as turbine blade 102, component body 104 can be part of any turbomachine component 100. Component body 104 may include any material capable of withstanding operation in a turbine system, e.g., a gas turbine, steam turbine, jet engine, compressor, etc.

Figure 4:
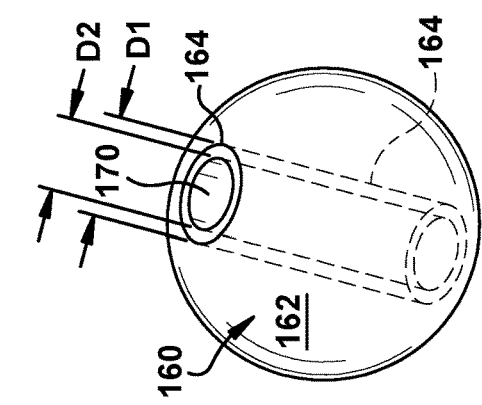
FIG. 4 shows a perspective view of a PSP sealing device including a hollow member in an opening therein, according to embodiments of the disclosure.
Figure 6:
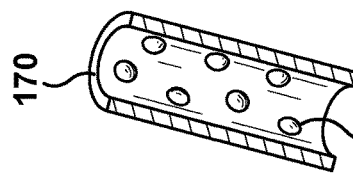
FIG. 6 shows a cross-sectional view of a hollow member, according to other embodiments of the disclosure.
Figure 5:
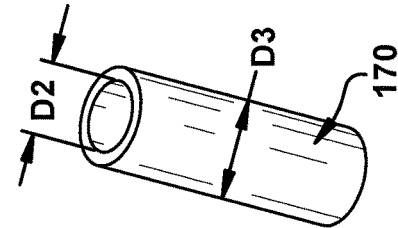
FIG. 5 shows a perspective view of a hollow member for a PSP sealing device, according to embodiments of the disclosure.
Figure 12:
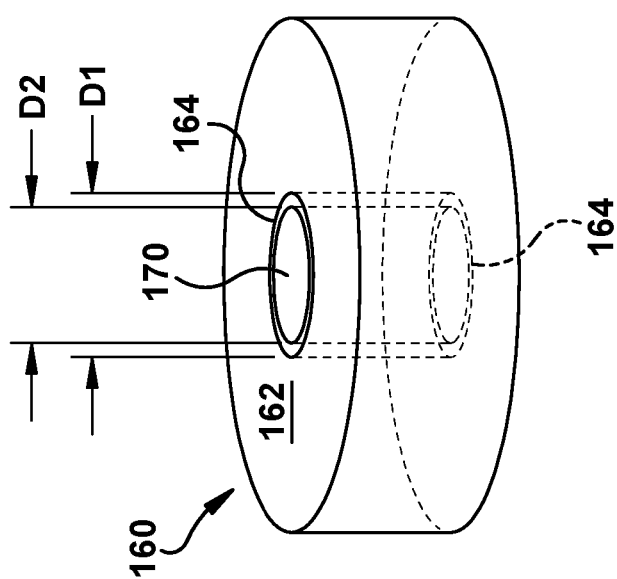
FIG. 12 shows a perspective view of a PSP sealing device including a hollow member in an opening therein, according to embodiments of the disclosure.
Figure 13:
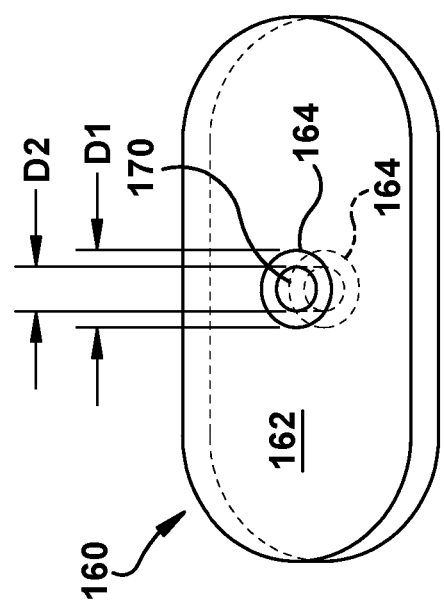
FIG. 13 shows a perspective view of a PSP sealing device including a hollow member in an opening therein, according to embodiments of the disclosure.
Figure 11:
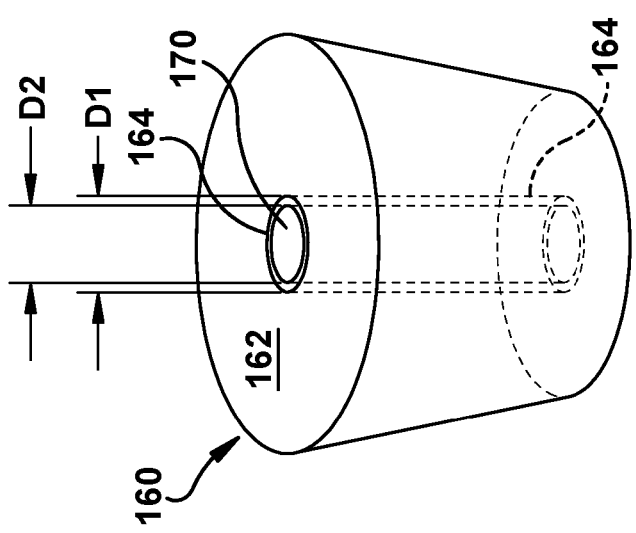
FIG. 11 shows a perspective view of a PSP sealing device including a hollow member in an opening therein, according to embodiments of the disclosure.

FIG. 4 shows a perspective view of a flow metering apparatus 160; and FIG. 5 shows a perspective view of a hollow member 170 for positioning in an opening 164 in flow metering apparatus 160. FIGS. 11-13 show perspective views of different implementations of a flow metering apparatus 160: FIG. 11 shows a frustoconical implementation, FIG. 12 shows a cylindrical implementation, and FIG. 13 shows a right rounded rectangular prism shaped implementation. Depending on the shape of passage in which flow metering apparatus 160 will be installed, any of the implementations illustrated in FIGS. 4 and 11-13 can be used, though the implementations shown are illustrative and non-limiting examples. That is, other shapes can be used within the scope of embodiments disclosed herein.

Referring to FIGS. 3-7, with additional reference to FIGS. 11-13, flow metering apparatus 160 includes a sealing body 162 made of a pre-sintered preform (PSP) material. PSP materials include a blend of superalloy and braze powders that allow selective build-up of surfaces to be created quickly with a brazing process. PSP materials may include any now known or later developed material appropriate for the application in which used, i.e., customized for the component in which used. Sealing body 162 may have a any suitable shape, such as a generally spherical shape, with perhaps some minor deformities as would be expected for bodies made of PSP materials. Sealing body 162 includes an opening 164 defined therethrough having a first cross-sectional area A1. As shown in the cross-sectional view of FIG. 9, opening 164 may be formed by any now known or later developed technique, e.g., drilling, electric discharge machining, etc. Where opening 164 is (pre-) drilled, first cross-sectional area A1 may be determined by diameter D1 of opening 164, i.e., $A1=\pi(D1/2)^2$. Where opening 164 is not circular, first cross-sectional area A1 can be calculated in any manner.

Flow metering apparatus 160 also includes a hollow member 170 fixed within opening 164 defined through sealing body 162. Hollow member 170 has a second cross-sectional area A2 smaller than first cross-sectional area A1 of opening 164. Second cross-sectional area A2 may be selected to provide any desired coolant flow, e.g., rate, volume, etc., through sealing body 162 and flow metering apparatus 160. Hollow member 170 may have any desired internal cross-sectional shape, e.g., circular, oval, polygonal, etc. As shown in the cross-sectional view of FIG. 6, hollow member 170 may include any variety of turbulators 174 therein. As shown in the cross-sectional view of FIG. 7, hollow member 170 may include any variety of metering elements 176 to control a coolant flow therethrough. In one example, shown in FIG. 4, hollow member 170 may have a circular internal cross-sectional shape with a diameter D2. Where hollow member 170 has a circular internal cross-sectional shape having diameter D2, second cross-sectional area A2 may be determined by diameter D2, i.e., $A1=\pi(D2/2)^2$. Where hollow member 170 is not circular, second cross-sectional area A2 can be calculated in any manner.

Hollow member 170 is made of a material having a melt temperature higher than a melt temperature of the PSP material. In one embodiment, hollow member 170 may be made of any material capable of not losing shape during the brazing of flow metering apparatus 160, and during operation of turbine component 100. In one example, hollow member 170 may be made of only superalloy such as Hastelloy X, Inconel, Rene alloys, but with the ability to select custom materials based on the end use of the component. In this manner, when flow metering apparatus 160 is brazed into place in metered passage 130, flow metering apparatus 160 retains fluid communication therethrough, such as between passages 132, 134 in the FIG., via hollow member 170. Hollow member 170 is not impacted by the brazing process. As noted, coolant flow allowed through metered passage 130 by flow metering apparatus 160 is metered based on second cross-sectional area A2 of hollow member 170.

Hollow member 170 may be fixed in opening 164 in any manner. In one option, hollow member 170 may have an exterior cross-sectional shape and size, e.g., diameter D3 (FIG. 5), configured to interference fit with internal surface of opening 164. Hollow member 170 can be forced into the internal surface of opening 164, for example, along its length to create the interference fit. In another option, hollow member 170 may have an exterior cross-sectional shape and size, e.g., diameter D3 (FIG. 5), configured to freely slide into internal surface of opening 164, and hollow member 170 may be expanded radially outwardly into an interference fit with the internal surface of opening 164, e.g., by any mechanism capable of radially expanding hollow member 170. In another option, shown in the cross-sectional view of FIG. 8, hollow member 170 may include a flange 172 extending (radially) from at least one end thereof (both shown). Each flange 172 may engage with an end 177 of opening 164 to fix hollow member 170 in opening 164. Flanges 172 can be formed on hollow member 170, for example, by expanding ends 175 thereof radially outwardly into a tight fit with end(s) 177 of opening 164, e.g., by any mechanism capable of radially expanding hollow member 170. Alternatively, flanges 172 may be coupled to hollow member 170 using any appropriate joining technique, e.g., welding, brazing, soldering. In another option, hollow member 170 may fixed in opening 164 by any appropriate joining technique, e.g., welding, brazing, soldering.

Embodiments of the disclosure also include turbine component 100 including ball 160. As shown in FIGS. 2-3, turbine component 100 may include component body 104 having metered passage 130 therein, such as a ball-chute. Flow metering apparatus 160 is positioned in metered passage. Flow metering apparatus 160 includes sealing body 162 brazed into position in metered passage 130. Sealing body 162 is made of PSP material, as described herein. Sealing body 162 has opening 164 defined therethrough having first cross-sectional area A1. Hollow member 170 is fixed within opening 164 defined through sealing body 162. Hollow member 170 has second cross-sectional area A2 smaller than first cross-sectional area A1 of opening 164. Hollow member 170 is made of a material having a melt temperature higher than a melt temperature of the PSP material. Hollow member 170 can include the material listed herein, and can be fixed in opening 164, as described herein.

With reference to FIG. 3, and the cross-sectional views of FIGS. 9 and 10, a method according to embodiments of the disclosure will now be described. Embodiments of the method may include forming opening 164 in flow metering apparatus 160. FIG. 9 shows a cross-sectional view of forming opening 164 in sealing body 162. Opening 164 may be formed by any now known or later developed technique, e.g., drilling, electric discharge machining, etc. FIGS. 4 and 8 show fixing hollow member 170 in opening 164. Hollow member 170 may be fixed in opening 164 in any manner described herein.

FIGS. 3 and 10 show positioning flow metering apparatus 160 in metered passage 130 in turbine component 100. In one option, as shown in FIG. 3, flow metering apparatus 160 may be positioned in metered passage 130 using any now known process, such as simply dropping flow metering apparatus 160 into passage 132 or metered passage 130 and allowing it to fall by gravity into position. In another embodiment, shown in FIG. 10, positioning flow metering apparatus 160 in metered passage 130 may include feeding flow metering apparatus 160 along an elongated member 180 extending through hollow member 170 and into metered passage 130. Flow metering apparatus 160 slides along elongated member 180, which positions flow metering apparatus 160 and hollow member 170 in metered passage 130 to maintain fluid communication through hollow member 170 and through metered passage 130 after the brazing. Elongated member 180 may include any structure capable of being positioned in passage(s) 132, 134 and/or metered passage 130 in a manner at which a distal end thereof can position flow metering apparatus 160 in metered passage 130. For example, elongated member 180 may include a wire, a thread/rope, or other flexible elongated member. Elongated member 180 may extend above or into metered passage 130. While shown in a generally linear arrangement, elongated member 180 can be routed through any variety of turns in passage(s) 132, 134.

The method may also include brazing sealing body 162 of flow metering apparatus 160 in metered passage 130 (curved arrows in FIGS. 3 and 8). Hollow member 170 maintains fluid communication through ball 160 after the brazing. In this manner, coolant flow between passages 132, 134 can be provided even though the location of flow metering apparatus 160 in metered passage 130 is not accessible, e.g., for drilling of flow metering apparatus 160. Since hollow member 170 is made of a material having a higher melt temperature than the PSP material, and a higher melt temperature than that of the brazing process and the operating temperature of turbine component 100, hollow member 170 will maintain fluid communication between passages 132, 134. Hollow member 170 can be sized to have second cross-sectional area A2 provide any desired flow characteristics. Any desired turbulators 174 (FIG. 6) and/or metering elements 176 can be provided in hollow member 170.

Embodiments of the disclosure reduce larger metered passage 130 while embedding a smaller passage (in hollow member 170) in the PSP material, preventing the quality issues from using traditional hole drilling operations. More particularly, the hollow member allows the flow metering apparatus to be brazed into place in a metered passage in a turbine component, yet continue fluid communication through the metered passage with the coolant flow metered by the cross-sectional area of the hollow member. The hollow member also allows customized metering of the coolant flow therethrough.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A pre-sintered preform (PSP) sealing device for a metered passage of a turbine component, the PSP sealing device comprising:
   a sealing body made of a pre-sintered preform (PSP) material, the sealing body having an opening defined therethrough having a first cross-sectional area, and the sealing body having an outer dimension configured to position the sealing body in the metered passage of the turbine component; and
   a hollow member fixed within the opening defined through the sealing body, the hollow member having a second cross-sectional area smaller than the first cross-sectional area of the opening,
   wherein the hollow member is made of a material having a melt temperature higher than a melt temperature of the PSP material.

2. The PSP sealing device of claim 1, wherein the hollow member includes a flange extending from at least one end thereof, each flange engaging with an end of the opening to fix the hollow member in the opening.

3. The PSP sealing device of claim 1, wherein the material of the hollow member consists of a superalloy.

4. The PSP sealing device of claim 1, wherein the sealing body is a ball.

5. A turbomachine component, comprising:
   a component body having a metered passage therein; and
   a pre-sintered preform (PSP) sealing device positioned in the metered passage, the PSP sealing device including:
     a sealing body brazed into position in the metered passage, the sealing body made of a PSP material, the sealing body having an opening defined therethrough having a first cross-sectional area, the sealing body also having an outer dimension configured to position the sealing body in the metered passage; and
     a hollow member fixed within the opening defined through the sealing body, the hollow member having a second cross-sectional area smaller than the first cross-sectional area of the opening,
   wherein the hollow member is made of a material having a melt temperature higher than a melt temperature of the PSP material.

6. The turbomachine component of claim 5, wherein the hollow member includes a flange extending from at least one end thereof, each flange engaging with an end of the opening to fix the hollow member in the opening.

7. The turbomachine component of claim 5, wherein the material of the hollow member consists of a superalloy.

8. The turbomachine component of claim 5, wherein the component body includes a turbine blade airfoil.

9. The turbomachine component of claim 8, wherein the turbine blade airfoil is in a first stage of a turbine.

10. The turbomachine component of claim 5, wherein the sealing body is a ball.

11. A method comprising:
positioning a pre-sintered preform (PSP) sealing device in a metered passage in a turbomachine component, the PSP sealing device including:
a sealing body made of a PSP material having an outer dimension configured to position the sealing body in the metered passage, the sealing body having an opening defined therethrough, the opening having a first cross-sectional area; and
a hollow member fixed within the opening of the sealing body, the hollow member having a second cross-sectional area smaller than the first cross-sectional area of the opening; and
brazing the sealing body of the PSP sealing device in the metered passage, wherein the hollow member maintains fluid communication through the sealing body after the brazing.

12. The method of claim 11, wherein the hollow member includes a flange extending from at least one end thereof, each flange engaging with an end of the opening to fix the hollow member in the opening.

13. The method of claim 11, wherein the hollow member is made of a different material than the PSP material.

14. The method of claim 11, wherein the material of the hollow member has a melt temperature higher than a melt temperature of the PSP material.

15. The method of claim 11, wherein the material of the hollow member consists of a superalloy.

16. The method of claim 11, further comprising:
forming the opening in the sealing body; and
fixing the hollow member in the opening.

17. The method of claim 16, wherein the fixing the hollow member includes forming a flange extending from at least one end thereof, each flange engaging with an end of the opening to fix the hollow member in the opening.

18. The method of claim 16, wherein the fixing the hollow member includes expanding the hollow member to engage with an inner surface of the opening in an interference fit.

19. The method of claim 11, wherein the positioning the PSP sealing device in the metered passage includes feeding the PSP sealing device along an elongated member extending through the hollow member and into the metered passage, the elongated member positioning the PSP sealing device and the hollow member to maintain fluid communication through the hollow member and along the metered passage after the brazing.

20. A flow metering apparatus, comprising:
a sealing body made of a pre-sintered preform (PSP) material, the sealing body having an opening defined therethrough having a first cross-sectional area, and the sealing body having an outer dimension configured to position the body in a metered passage of a turbine component; and
a hollow member fixed within the opening defined through the sealing body, the hollow member having a second cross-sectional area smaller than the first cross-sectional area of the opening,
wherein the hollow member is made of a material having a melt temperature higher than a melt temperature of the PSP material and includes a flange extending from at least one end thereof, each flange engaging with an end of the opening to fix the hollow member in the opening.

* * * * *